United States Patent [19]
Morong, Jr.

[11] 3,790,888
[45] Feb. 5, 1974

[54] LAG ADJUSTMENT MEANS FOR A WATTHOUR METER

[75] Inventor: William H. Morong, Jr., Durham, N.H.

[73] Assignee: General Electric Company

[22] Filed: Oct. 6, 1972

[21] Appl. No.: 295,449

[52] U.S. Cl. ............................................. 324/138
[51] Int. Cl. .......................................... G01r 11/02
[58] Field of Search ........................... 324/137, 138

[56] References Cited
UNITED STATES PATENTS
2,858,508  10/1958  Jewell ............................... 324/138
FOREIGN PATENTS OR APPLICATIONS
1,013,006  8/1957  Germany ........................... 324/138

Primary Examiner—Alfred E. Smith
Attorney, Agent, or Firm—Vale P. Myles; Francis X. Doyle; Volker R. Ulbrich

[57] ABSTRACT

A watthour meter is provided with an improved reactor assembly for a lag plate. The reactor assembly is linearly adjustable to selectively and precisely vary the inductance of the lag plate so that its lag effect on the meter performance can be accurately, and reversibly, adjusted. This linearity of adjustment is afforded by mounting a flux-shunting adjustable screw in threaded engagement with opposite sides of an air gap in a reactor that has a flux path of varied cross-section parallel to the direction of movement of the screw. A resilient holding means is used to mount the screw for movement in a direction transverse to the magnetic field induced in the reactor by the lag plate.

15 Claims, 7 Drawing Figures

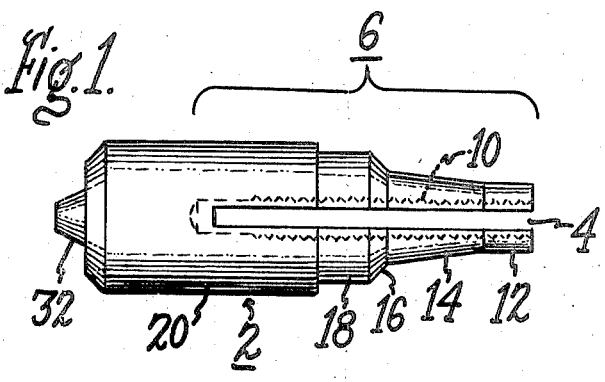
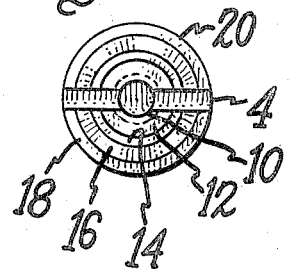
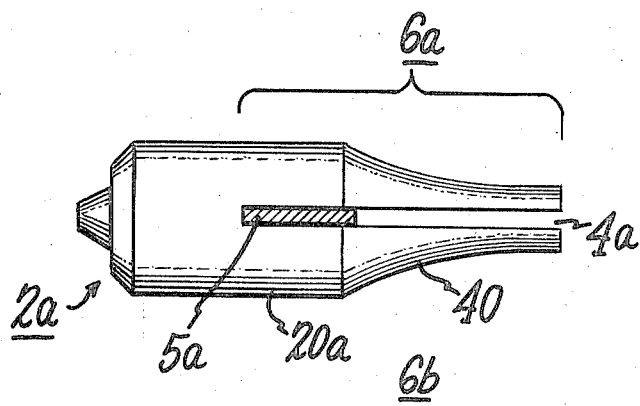
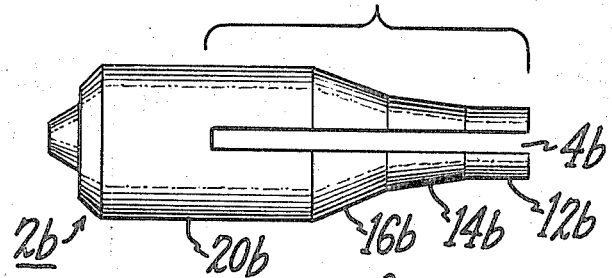
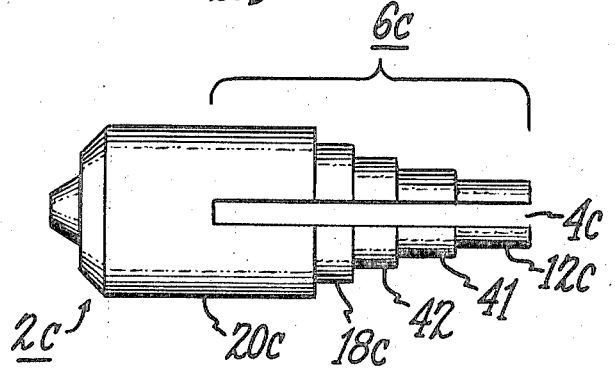

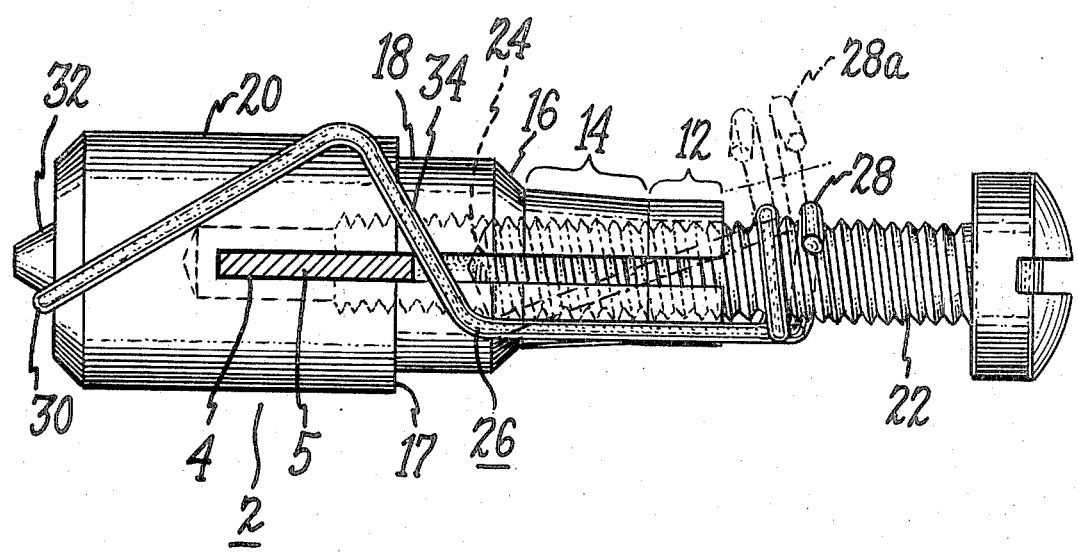
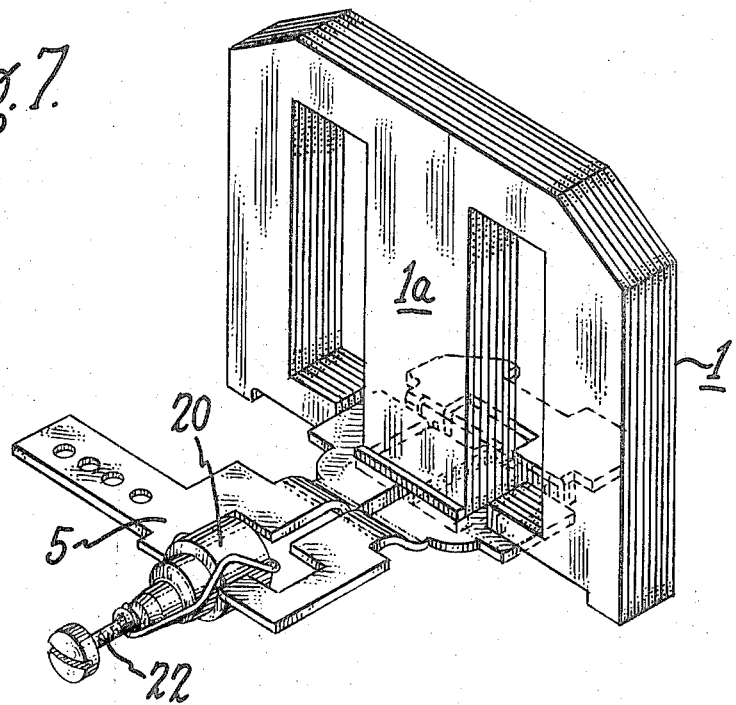

LAG ADJUSTMENT MEANS FOR A WATTHOUR METER

BACKGROUND OF THE INVENTION

The present invention relates generally to an adjustable lagging means for an alternating current induction watthour meter. More specifically, the invention provides an improved reactor assembly for a watthour meter lag plate whereby adjustment of the reactor assembly varies the inductance of the lag plate in an improved linear fashion.

It is well known in the watthour meter art to utilize a lag plate to permit an adjustment of the lag of the meter. For example, such a lag plate is disclosed in U.S. Pat. No. 2,146,606—Trekell, which issued on Feb. 7, 1939 and is assigned to General Electric Company. Conventionally, such lag plates are formed of electrically conductive metal stock that is perforated to form a window therein that substantially surrounds the stator pole for the meter's potential winding. As pointed out in the above-mentioned prior art patent, it was at one time common practice in the watthour meter art to provide lag plates that were movable with respect to the potential winding of the meter to permit adjustment of the lag effect. It has now become a more common practice to mount a lag plate in relatively fixed position with respect to the potential winding stator of a watthour meter, in the manner shown, for example, in U.S. Pat. No. 2,321,437—Trekell, which issued June 8, 1943 and is also assigned to General Electric Company. In such relatively fixed lag plate mounting arrangements, it is desirable to provide some means, such as the variable resistance loop disclosed and claimed in this latter Trekell patent, to selectively adjust the electrical resistance of the lag plate. In fact, the adjustment of the lagging capability of watthour meter lag plates is such a necessary function in high-accuracy watthour meters that other unique arrangements have been developed for varying the electrical resistance of such lag plates. One such additional arrangement is disclosed and claimed in U.S. Pat. No. 2,836,795—Busch, which issued May 27, 1958 and is also assigned to the assignee of the present invention.

In addition to the type of arrangements just mentioned for selectively changing the electrical resistance of a watthour meter lag plate, it is also known in the watthour meter art to utilize blocks of magnetic material mounted adjacent the conductive loop of the lag plates in such meters to afford a temperature compensating effect. An example of such a temperature compensated lag plate for watthour meters is shown in U.S. Pat. No. 2,050,881—Faus, issued Aug. 11, 1936 and assigned to the assignee of the present invention.

Furthermore, it is also known in the watthour meter art to utilize a block of magnetic material mounted on a leg of a lag plate with an open passageway in one side of the block. With a screw formed of iron, or other suitable ferromagnetic material, rotatably engaged within such a passageway it is possible to adjust the magnetic reluctance of a flux path formed through the block of material across the passageway. Such blocks of magnetic material are commonly referred to as reactors. Since a change in the reluctance of the magnetic flux path results in a change of the inductance of the lag plate current conducting loop due to the inductive coupling between the lag plate and the reactor, the lagging effect of the plate can be quickly and easily adjusted in a reversible manner by adjusting the relative position of the magnetic screw in the passageway.

Although the various lag compensating arrangements known in the prior art provide desirable means for accomplishing the particular type of adjustments for which they were designed, they also incorporate some disadvantages. In particular, the known prior art arrangements for changing the electrical resistance of a lag plate, as described in the second and third patents mentioned above, are primarily irreversible procedures, since they require the breaking or removal of a conducting punch-out or scored strip in the lag plate. In addition, such prior art means of adjusting lag plate resistance are relatively difficult to employ since their inherent irreversible nature makes it necessary to perform a lag adjusting operation in very small increments to make sure that an undesirable over-adjustment is not performed. Moreover, the necessarily incremental nature of such adjustments makes it extremely difficult to obtain fine-adjustment control of meter lagging.

Attempts have been made to overcome these disadvantages in lag adjusting means. For example, it is known to use a sliding contact on a lag loop adjustment to afford a reversible means for varying the lag plate resistance. However, such prior art expedients suffer from other shortcomings, such as the introduction of variable or unstable contact resistances into the lag adjusting arrangement.

With respect to prior art lag adjusting means, it is thus apparent that a major disadvantage in them resides in the fact that they cannot, due to their nature, provide a linear adjustment of the lagging effect. Of course, the non-linearity problem does not reside solely in the various adjustable reactor devices that have been developed, but such prior art reactors do not lend themselves readily to linear adjustment of the reluctance of magnetic flux paths therein. This limitation is due to the fact that prior art reactors have an essentially constant flux path length (1) and the cross-sectional area (A) of their flux path is regulated only by varying the position of an adjusting screw, whose pitch is necessarily constant. Thus, as indicated by the following formula for reluctance (R), such prior art adjustable reactors are not readily linearized:

$$R = 1/\mu A$$

Of course, permeability ($\mu$) is not mechanically adjustable. Accordingly, adjustment of the lagging in prior art meters must be performed in a trial and error manner for different rotational engagements of an adjustable screw within a meter lag plate reactor.

Another disadvantage of prior art reactors is that the range of adjustment is unduly limited because, as noted above, the length of the magnetic flux path within the reactor is constant with only the area of the flux path being altered by the engagement or disengagement of an adjustable screw. Furthermore, prior art reactors usually require manufacturing processes utilizing individual machine operations having a resultant cost substantially greater than that involved in making reactors in accordance with the teaching of the present invention.

The present invention comprises a reactor assembly for use in a watthour meter structure having a lagging adjustment of greatly improved linearity. The improved linearity is provided by variation of the cross-sectional area of magnetic flux paths at different positions of engagement of a screw formed of iron, or other suitable ferro-magnetic material such as carbon steel, silicon steel or magnetic stainless steel, within the reactor. In addition, a reactor for the present invention provides a greater range of adjustment of its lagging effect by incorporating means for varying the length of the magnetic flux path, in conjunction with a variation of the flux path cross-sectional area as mentioned above. This is accomplished by having the magnetic screw oriented substantially perpendicular to a current path through that portion of the lag plate on which the reactor is mounted. Therefore, as the screw is progressively moved toward and away from the lag plate, the flux paths around the plate, through the screw, are alternately shortened or lengthened.

A further structural consideration of the present invention is an arrangement for mounting the reactor on the lag plate. A wire spring which is formed to be biased both against the lag plate and an adjustable reactor screw, is utilized. This performs the multiple functions of retaining the reactor firmly in place on the lag plate and preventing any stray movement or casual adjustment of the screw. Included with the above advantages of the present invention is the fact that the cost of manufacturing is lower than for prior art reactors. This is due to the design of the reactor in the present invention being adaptable to manufacture by an automatic screw machine rather than individual machine operations as necessitated in prior art structures.

Accordingly, it is an object of the present invention to provide an improved reactor having a lagging adjustment of greatly improved linearity as accomplished by controlled variation of the area of the magnetic flux path in different portions of the reactor engaged by an adjustable magnetic screw.

A further object of the present invention is to provide a reactor for a watthour meter including a greater range of meter lag adjustment through variation of the permeance of the magnetic flux paths across an air gap in the reactor, while simultaneously varying the mean length of the flux paths.

Another object of the present invention is to provide a reactor with a holding means for holding a cooperating adjustable screw in place as well as for firmly holding the reactor in place when mounted.

A still further object of the present invention is to provide a reactor structure which can be readily manufactured at a lower cost than those reactor designs taught in the prior art.

SUMMARY OF THE INVENTION

In one preferred embodiment of the invention, a watthour meter having a lag plate is provided with an improved reactor mounted on it. Pursuant to the invention, one portion of the reactor is slotted and adapted to rotatably receive a magnetic screw. The screw is received in a direction substantially perpendicular to a leg of the lag plate and is adjustable to vary the magnetic permeance of a flux path formed through the reactor across the slot. A primary improvement included in the present invention is the provision of a reactor having a novel configuration that affords an improved linearity of adjustment of the reluctance of the magnetic flux path when the magnetic screw is adjusted. In addition, a unique spring is provided for holding both the screw and reactor in assembled, relatively adjustable relationship.

DESCRIPTION OF THE DRAWINGS

The subject matter which is regarded as the invention is particularly pointed out and distinctly claimed in the claims set forth at the end of the specification. The invention, however, both as to organization and manner of use may be best understood by reference to the following description, taken in conjunction with the accompanying drawings, in which:

FIG. 1 is a side view of a watthour meter lag adjusting reactor with an inwardly extending slot located on the longitudinal axis thereof pursuant to the present invention. The inwardly extending slot cuts through the transverse cross section of the reactor to create the bifurcated appearance shown in this view. A tapped hole extends inwardly from the outer end of the slot along the longitudinal axis of the reactor.

FIG. 2 is an end view of the reactor illustrated in FIG. 1, showing the several cylindrical surfaces on the reactor provided by the various stepped portions seen in FIG. 1.

FIG. 3 is a side view of the reactor assembly of the invention shown in an assembled condition. The reactor assembly includes the reactor, a magnetic metal screw, or adjustment means, and a spring for holding the screw in a predetermined position. This view also illustrates the spring in a position it will occupy prior to being concentrically engaged by the screw.

FIGS. 4, 5 and 6 are side views of alternative embodiments of a reactor, such as those shown in FIGS. 1 and 2, which are constructed pursuant to the present invention.

FIG. 7 is a perspective view of an alternating current watthour meter sub-assembly including a lag plate on which is mounted the improved lag adjustment means formed pursuant to the teaching of the present invention.

DESCRIPTION OF THE PREFERRED EMBODIMENT

Referring to FIG. 1 of the drawings, there is shown a side view of a reactor that embodies a preferred form of the invention. The reactor 2 is a block of a suitable magnetic material, such as iron, carbon steel, silicon steel, magnetic stainless steel, etc. and it is formed from rod stock by an automatic screw machine; as opposed to prior art reactors which typically are formed from bar or strip magnetic material by a series of individual machining operations. The reactor shown in FIG. 1 includes an inwardly extending slot 4 defined by the inner walls of a bifurcated portion 6. The slot 4 includes a tapped segment 10 extending from the outer end of the slot 4 along the longitudinal axis of the reactor toward the inner end of the slot 4. Pursuant to the invention, the cross-sectional area of the reactor 2 is varied in a precisely controlled manner to enable the reactor to provide a nearly linear adjustment of the lagging effect, as will be explained in detail below. In the preferred embodiment of the invention described herein, this controlled variation of the cross-sectional area of reactor 2 is accomplished by making it of a solid body of magnetic material, and shaping the outer surface of the reactor 2 so it includes a plurality of steps 12, 14, 16, 18 and 20.

It should be understood that other embodiments of the invention may be preferred for alternative applications of it in which different amounts or degrees of change in lag adjustment might be required. Also, in some such alternative applications, various manufacturing costs may serve to make a given alternative embodiment of the invention a more preferred form. With these considerations in mind, several alternative reactor configurations that embody the present invention, are described below, following the description of the preferred embodiment, which has been found to be particularly suitable for making lag adjustments on a polyphase watthour meter.

As shown in FIG. 1 first, second and third smooth surfaced steps, respectively identified as 12, 18 and 20, are level and formed concentrically with respect to the longitudinal axis of the reactor. First and second uniformly sloped steps, respectively indicated as 14 and 16 are sloped with respect to the longitudinal axis of stator 2. An exposed end surface 17 results from the difference in diameters of the level steps 18 and 20.

FIG. 2 shows an end view of the various stepped areas on the external surface of the reactor 2. It can be seen that in this embodiment of the invention all of the individual stepped areas are cylindrical in cross section while being cut by the slot 4 along a transverse axis.

FIG. 3 shows the additional elements of the reactor assembly which comprise the present invention. The slot 4 is formed at the inner end thereof to substantially surround a portion 5 of a leg of a conventional watthour meter lag loop, or plate, as shown in cross section in FIG. 3. In addition, magnetic metal machine screw 22, or more generally any suitable, flux-shunting adjustable means adapted to be adjustably positioned or engaged within the slot 4, is mounted in the tapped section of reactor 2, as shown. The adjustable means or screw 22 can therefore be seen to complete a closed magnetic flux path across the slot 4, through the reactor 2. As the screw 22 is more fully engaged within slot 4, the reluctance of the closed magnetic flux path decreases as the area of contact of the screw across the slot 4 is increased. It will be appreciated by those skilled in the art that the lagging effect of a lag plate, or which leg portion 5 is a part, is directly proportional to the permeance of the closed magnetic path across slot 4 in reactor 2, due to the magnetic coupling between the lag plate and the reactor. Therefore, as the screw 22 is progressively engaged within the slot 4, the reluctance of the closed magnetic flux path within the reactor 2 decreases, or its permeance increases, and the inductance of a lag plate partially shown by portion 5 increases. The opposite is true when the screw 22 is more fully disengaged from the slot 4.

The general principle of reactive adjustment of a meter lag loop is well known in the watthour meter art. One of the major disadvantages with prior art reactive adjusting means has been a non-linear adjustment of the reluctance of a closed magnetic path as an adjusting screw is engaged or disengaged in a reactor. Such a non-linear adjustment results in correspondingly erratic lag plate inductance. One reason for this non-linearity is the presence of a flux path of variable permeance when only a small portion of a typical magnetic screw, such as 22, is initially engaged. This low quality flux path is due to the small number of threads in engagement with the reactor 2 across the slot 4 and the fact that one or more of the threads frequently may not perfectly mesh. As a consequence, a very high sensitivity of adjustment was normally encountered at the low permeance end of the range of adjustment of the iron screw. Conversely, as more threads of the screw were meshed with the reactor, there was a very low sensitivity of adjustment at the high permeance end of the range of adjustment. The problem, therefore, with such prior art designs was that they were highly non-linear and somewhat unpredictable at the low permeance end of their range so the user had to adjust the adjustment means by trial and error not knowing what degree of adjustment it might provide at any given point in the adjustment.

The present invention overcomes the foregoing problem by greatly reducing the flux path area at different portions of initial engagement of the lag adjusting screw, and by varying the mean length of the flux path through reactor 2 as a function of the engagement of screw 22 therewith. In the normal operation of the invention when the screw 22, shown in FIG. 3, is initially engaged in slot 4, the area of the flux path adjacent both sides of the screw 22 becomes saturated. Therefore, the high permeance of this portion of the flux path, due to the engagement of screw 22, is somewhat off-set by the saturated condition. It should be noted that this characteristic is to be distinguished from prior art adjustable reactors in which the flux carrying areas adjacent an adjustable screw were uniform in cross section along the full range of engagement of such a screw. As more threads of screw 22 become engaged in the slot 4, the sensitivity of any further engagement of the screw 22 is more predictable, therefore, pursuant to the invention the flux path areas adjacent the tip 24 are increased in size as the screw 22 is further engaged. In this regard, note that the outer surface of step 14 is sloped outwardly in the direction of inward movement of screw 22. In addition, sloped step 16 and level steps 18 and 20 are accurately spaced to optimize the linearity of adjustment afforded by the preferred embodiment of reactor assembly disclosed herein.

A further advantage of the present invention is to be found in the manner in which the magnetic flux path is closed across the slot 4. Typically, in prior art designs an adjustable screw is oriented in a reactor parallel to a portion of a lag plate leg on which the reactor is mounted. As the screw in such an arrangement is engaged or disengaged, the average length of the closed magnetic flux path remains unchanged. However, in the present invention, as noted briefly above, the screw 22 is oriented substantially perpendicular to the current path through portion 5 of the lag plate, so upon engagement or disengagement of the screw 22 the average length of the closed magnetic flux path is respectively decreased or increased. This novel arrangement affords a greater range of lag adjustment, as well as more uniform sensitivity of such adjustments.

As pointed out above, various alternative embodiments of the reactor portion of the invention may be more suitable for certain applications. In fact, several alternative reactor configurations have been analyzed and found to be suitable for adjusting the lagging effect in induction type electric meters. These alternative embodiments are illustrated in FIGS. 4, 5 and 6. Since each of these reactors will perform a function similar to the function of reactor 2, illustrated in FIGS. 1 and 2, similar reference numerals are used to identify their respective portions, with different alpha-numeric suffixes being employed for each embodiment shown. Thus, there is depicted in FIG. 4 a reactor 2a having a bifurcated portion 6a, the inner walls of which define a slot 4a. In its assembled position, the reactor is positioned on one leg portion 5a of a watthour meter lag plate, or loop. As in the preferred embodiment of the invention, the reactor 2a is formed of substantially solid magnetic metal so that a reduction in the diameter of the surface area necessarily results in a reduction of the flux carrying cross-sectional area of the reactor. The outer surface of the reactor 2a is generally circular, so that it may be readily formed by a high speed screw machine; however, it should be appreciated that other surface configurations, such as a polygonal or triangular shape, may be used in some forms of the invention, if desired.

At its maximum diameter end the reactor 2a comprises a smooth cylindrical surface 20a. The remainder of the reactor comprises a parabolic surface of revolution 40 that extends from one end of the surface 20a to the outer end of bifurcated portion 6a. For watthour meter applications, it has been found that with the premeability factors of conventional reactor metals the maximum diameter of surface 20a should not exceed one-half inch and should not be less than one-fourth inch, while the minimum diameter of the outer end of parabolic surface 40 should not be less than one-eighth inch and should not exceed one-fourth inch. It will be understood that an adjustable magnetic screw, such as screw 22 shown in FIG. 3, will be rotatably mounted in the slot 4a of reactor 2a to vary the permeance thereof in the manner explained above with reference to the embodiment of FIGS. 1–3. Similar adjustment means will also be used with the embodiments illustrated in FIGS. 5 an 6, which will now be described.

The reactor 2b shown in FIG. 5 differs from the reactor 2a of FIG. 4 only in that a pair of sloped frusto-conical outer surfaces 14b and 16b are formed on the outer surface of reactor 2b, between a pair of cylindrical surfaces 12b and 20b; rather than utilizing the parabolic outer surface 40. However, it can be seen that these surfaces approximate the parabolic surface 40 and thus serve to vary the flux carrying cross-sectional area of reactor 2b in generally the same desirable manner as described above.

Finally, in FIG. 6 there is shown a reactor 2c that differs from reactors 2a and 2b only in that a plurality of generally cylindrical surfaces 12c, 41, 42, 18c and 20c are used to replace the parabolic surface 40 of reactor 2a and the surfaces 12b, 14b, 16b and 20b of reactor 2b. These cylindrical surfaces are of different diameters, as shown, so the flux carrying cross-sectional area of the reactor 2c is varied along its length to perform the function explained above. An advantage of the form of reactor 2c is that it may easily be machined on a simple lathe.

Now an additional feature of the invention will be described. This feature is the provision of a novel holding means 26, shown in FIG. 3. In the preferred embodiment, holding means 26 comprises a spring having a coiled portion 28 and a looped end portion 30. The spring 26 is designed to be mounted on the reactor 2 so that an abutment 32 on one end of the reactor engages the looped end portion 30, while the coiled portion 28 is concentrically mounted about the screw 22. A mid-portion 34 of the spring 26 is wedged against the portion 5 of the lag plate when in assembled position, as shown in FIG. 3. Accordingly, the spring 26 operates to hold the reactor 2 in a firm position with respect to the lag plate while the coiled portion 28 provides a restraint against casual rotation of the iron screw 22. To facilitate a clear understanding of the resilient holding bias exerted by spring 26 in its operating position the coiled portion 28a of spring 26 is shown in dotted lines to illustrate the unloaded orientation of the spring prior to its concentric engagement about the screw 22.

Although it is felt that the foregoing description of the invention is completely sufficient to teach those skilled in the art how to utilize it, there is shown in FIG. 7 the reactor assembly of FIG. 3 as it could be suitably mounted in operating position on a typical watthour meter potential stator and lagging loop sub-assembly.

It is recognized that various modifications may be made in the invention as it is described herein; therefore, it is intended to cover in the appended claims, all modifications that fall within the true spirit and scope of the invention.

What is claimed as new and desired to be secured by Letters Patent of the United States is:

1. For an inductively controlled lag plate in a watthour meter sub-assembly, a lag adjustment means comprising:

a block 2 of magnetic material including a bifurcated portion 6 defining an inwardly extending slot 4, said slot 4 being formed at an inner end thereof to at least partially surround a portion 5 of a leg of a watthour meter lag plate, adjustable means 22 movably mounted within said slot 4 to form a variable permeance closed magnetic flux path across the slot, said adjustable means being movable toward and away from the inner end of the slot thereby to selectively vary the magnetic permeance of flux paths across said slot 4, while simultaneously varying the mean length of flux paths intersecting said adjustable means 22.

2. A lag adjustment means according to claim 1 wherein said adjustable means 22 comprises an elongated metal screw.

3. A lag adjustment means as defined in claim 1 wherein the external surface of said block comprises a plurality of steps of progressively larger diameters extending from the small diameter end of the block adjacent the outer end of said slot to a point adjacent the inner end of said slot.

4. A lag adjustment means according to claim 3 wherein at least three uniformly level steps 12, 18, 20 are formed on said external surface of said block.

5. A lag adjustment means according to claim 4 wherein said external surface includes; a first uniformly sloped step 14 that extends between the surface of the smallest uniformly level step 12 and the minimum diameter end of an adjacent second uniformly sloped step 16, said second uniformly sloped step 16 being formed to extend between the maximum diameter end of said first uniformly sloped step 14 and the surface of said second uniformly level step 18, and said second uniformly level step 18 being formed to extend between said maximum diameter end of said second uniformly sloped step 16 and a point adjacent said third uniformly level step 20.

6. A lag adjustment means according to claim 5 wherein said external surface includes an exposed end surface 17 that extends between said second uniformly level step 18 and the third step 20 and is substantially perpendicular to the surfaces of the second and third steps.

7. A lag adjustment means as defined in claim 2 wherein the external surface of said block comprises a parabolic surface of revolution 40 that extends from the outer end of said bifurcated portion 6a to a cylindrical surface 20a of the block.

8. A lag adjustment means as defined in claim 2 wherein the external surface of said block comprises a pair of cylindrical surfaces 12b and 20b at opposite ends thereof, said pair of cylindrical surfaces having different respective diameters with the smallest diameter surface 12b being at the outer end of said bifurcated portion 6, and further comprising a pair of sloped frusto-conical surfaces disposed in abutting, end-to-end relationship between said pair of cylindrical surfaces, thereby to vary the flux-carrying cross-sectional area of said block 2b as a function of the distance of such a path from the portion 5 of the meter lag plate.

9. A lag adjustment means as defined in claim 2 wherein the external surface of said block comprises a plurality of generally cylindrical surfaces 12c, 41, 42, 18c and 20c that are of increasingly larger diameters, respectively, each of said cylindrical surfaces being arranged in end-to-end relationship, thereby to vary the flux-carrying cross-sectional area of the block 2c along the length thereof.

10. A lag adjustment means according to claim 2 including a holding means for resiliently securing said screw in a variety of selected operating positions, said holding means being operable to wedge said block of magnetic material against a portion 5 of a watthour meter lag plate when mounted in operating position thereon, thereby to hold said block in a predetermined relationship with respect to the lag plate.

11. A lag adjustment means according to claim 2 wherein said holding means comprises a spring 26 having a coiled portion 28 and a looped end portion 30, said spring 26 being operatively mounted on said block of magnetic material 2 with said looped end portion 30 engaging an end of said block and with said coiled portion concentrically encompassing said screw thereby to resiliently secure said screw in a variety of predetermined positions with respect to said block.

12. A lag adjustment means according to claim 11 wherein said block includes an abutment 32 on said end thereof to abut said looped end portion of the spring and hold it in operative position.

13. In a watthour meter having a lag plate the improvement comprising; an adjustable inductive reactor 2 mounted on a portion 5 of said lag plate by a resilient holding means 26 that is effective to maintain a longitudinal axis of said reactor substantially perpendicular to a current path through said lag plate, in combination with a magnetic screw 22 rotatably mounted in a tapped passageway of said reactor substantially parallel to the longitudinal axis thereof, said screw being rotatable to thereby vary the permeance of flux paths across said passageway, while simultaneously varying the mean length of flux paths intersecting said screw.

14. An invention as defined in claim 13 wherein said reactor is tapered in a plurality of successive concentric steps in the outer surface thereof progressing from a small diameter step remote from the lag plate to a large diameter step adjacent said lag plate.

15. An invention as defined in claim 14 wherein said reactor includes an abutment 32 on the end thereof adjacent said lag plate, and wherein said holding means comprises; a spring having a coiled portion 28 on one end thereof, a looped end portion 30 and a connecting mid-portion 34; said mid-portion 34 being wedged against the lag plate when the looped portion is in engagement with said abutment 32 and the coiled portion 28 is positioned concentrically around the screw 22, thereby to resiliently bias said screw against rotation.

* * * * *